No. 839,973. PATENTED JAN. 1, 1907.
L. P. WALTER.
ROLLER BEARING.
APPLICATION FILED APR. 12, 1906.

2 SHEETS—SHEET 1.

WITNESSES:
Harry L. Amer.
C. L. Wheeler

INVENTOR
Lyman P. Walter
BY Dudley, Browne & Norton
Attorneys

No. 839,973. PATENTED JAN. 1, 1907.
L. P. WALTER.
ROLLER BEARING.
APPLICATION FILED APR. 12, 1906.

2 SHEETS—SHEET 2.

WITNESSES:

INVENTOR
Lyman P. Walter
BY
Attorneys

UNITED STATES PATENT OFFICE.

LYMAN P. WALTER, OF MOUNT CARROLL, ILLINOIS.

ROLLER-BEARING.

No. 839,973.　　　　Specification of Letters Patent.　　　　Patented Jan. 1, 1907.

Application filed April 12, 1906. Serial No. 311,347.

*To all whom it may concern:*

Be it known that I, LYMAN P. WALTER, a citizen of the United States, residing at Mount Carroll, in the county of Carroll and State of Illinois, have invented certain new and useful Improvements in Roller-Bearings; and I do hereby declare the following to be a full, clear, and exact description of the invention, such as will enable others skilled in the art to which it appertains to make and use the same.

This invention relates to an improved roller-bearing for wheel-axles, shafts, and the like, the object of the improvement being the production of an appliance of this character possessing advantages in point of simplicity and durability of construction and which in operation requires a minimum expenditure of oil or other lubricant.

The nature of the invention will be readily comprehended, reference being had to the following detailed description and to the accompanying drawings, in which—

Figure 1:
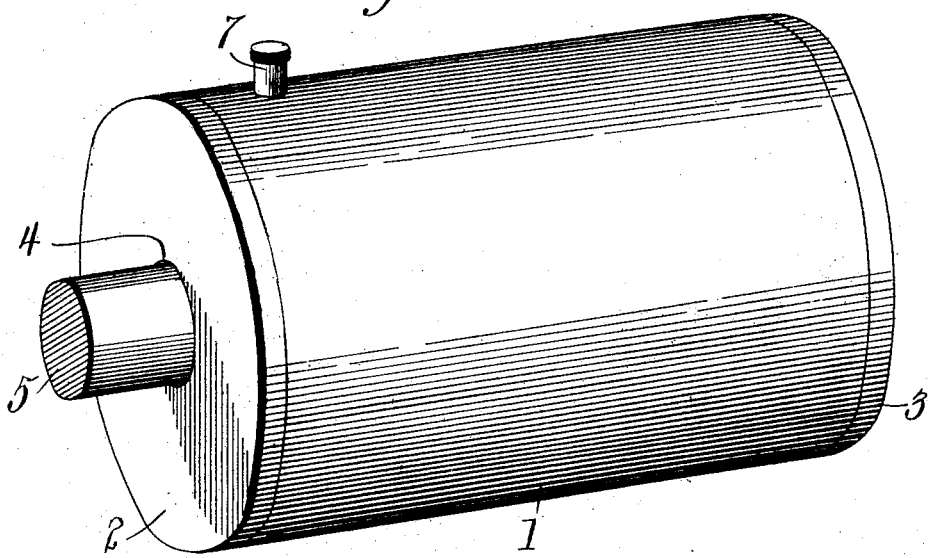
Figure 2:
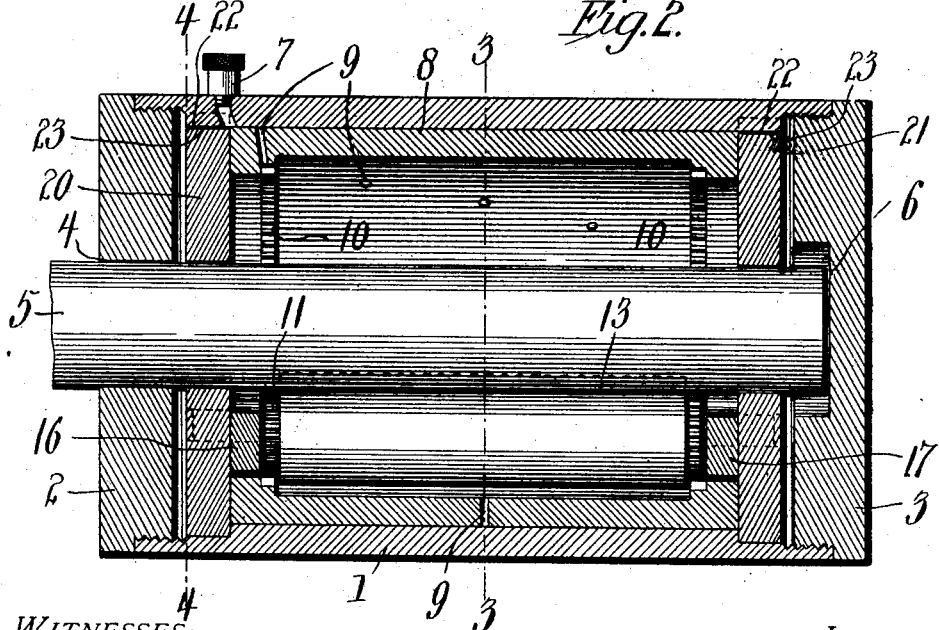
Figure 3:
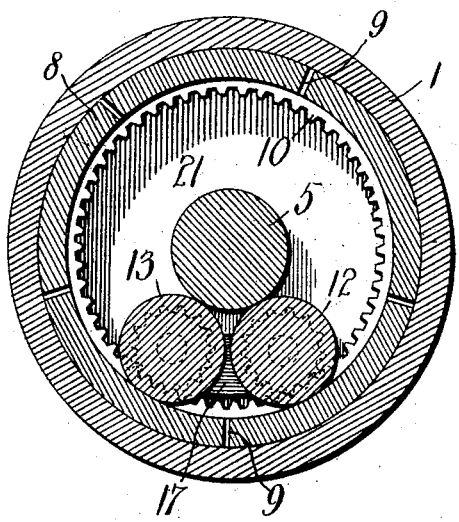
Figure 4:
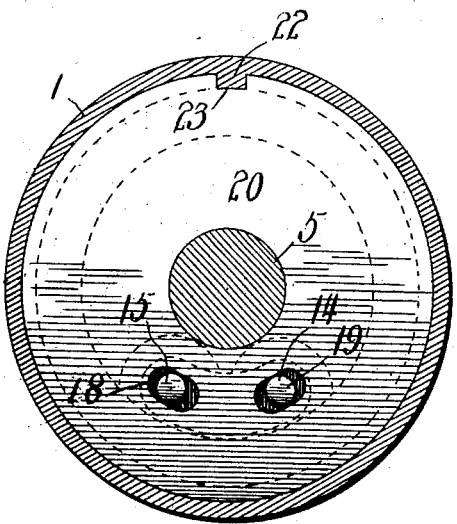
Figure 5:
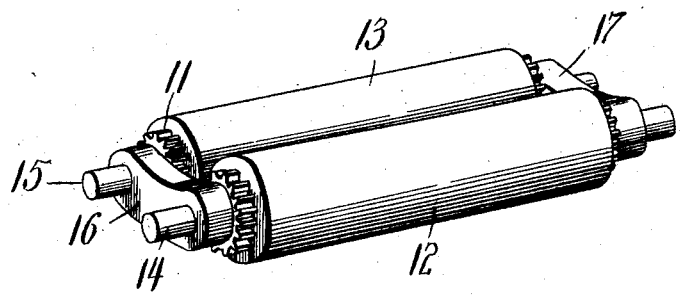

Figure 1 is a perspective view of a roller-bearing embodying the invention. Fig. 2 is a longitudinal sectional view of the same. Fig. 3 is a cross-sectional view taken on line 3 3 of Fig. 2. Fig. 4 is a cross-sectional view on line 4 4 of Fig. 2. Fig. 5 is a perspective view of the rollers.

Referring to the drawings by numerals, 1 designates the casing of the bearing, cylindrical in form and having its end portions internally threaded for engagement with threads provided on heads 2 3. The head 2 has a central opening 4 for the axle or shaft 5, the inner end of which may extend into a central recess 6 provided in the head 3. The provision of the head 3, which is imperforate, renders the bearing at that end dust and lubricant proof, and entrance of dust and escape of lubricant are prevented at the other end by reducing the clearance between the axle or shaft and wall of opening 4 to the minimum.

The casing 1 is provided with one or more cap-equipped oil or other lubricant inlets 7, the lubricant feeding between the inner surface of the casing and the outer surface of a roller-carrying sleeve or hub 8, rotating within the casing. The sleeve or hub is provided at intervals with a number of oil-ducts 9, which convey the lubricant to the shaft and rollers. It is to be understood that a sufficient quantity of lubricant will be supplied to partly fill the casing and sleeve and that the rollers in consequence rotate in a body of oil, and hence require attention at only very infrequent intervals.

The sleeve or hub is equipped internally toward each end with an annular series of teeth or other projections 10, engaged by teeth or projections 11, provided on the ends of each of two rollers 12 13, whereby rotation of the sleeve or hub is assured. In some instances, however, these teeth or projections are not necessary and may be dispensed with, friction alone being depended upon to rotate the sleeve or hub. The rollers are equipped with end shafts 14 15, which project through and beyond bearing-openings provided in links 16 17, the openings being spaced apart a sufficient distance to prevent contact between the rollers. The projecting ends of the roller-shafts enter openings 18 19, provided in disks 20 21, the latter being centrally apertured to receive the axle or shaft and held against rotation by tongues 22 on the casing engaging notches 23 in the disks. Thus the rollers are maintained in position to support the shaft, being arranged beneath the latter, as shown more clearly in Figs. 3 and 4.

In operation oil or other lubricant is supplied to the depth of, say, one-third of the casing, which practically immerses the rollers. Rotation of the axle or shaft obtains, by engagement, the rotation of the rollers, and the latter impart movement to the sleeve or hub, whereby the lubricant is distributed to all parts of the bearing and the axle or shaft revolves practically without friction.

The construction illustrated and above described in detail may be variously modified without exceeding the scope of the invention defined in the concluding claims.

I claim—

1. A roller-bearing comprising a non-rotatable casing, a sleeve or hub rotatable within said casing, an axle or shaft rotatable within the sleeve or hub, and a pair of separated rollers in contact with the shaft and sleeve or hub.

2. A roller-bearing comprising a non-rotatable casing, a sleeve or hub rotatable within said casing, an axle or shaft rotatable within the sleeve or hub, a pair of separated rollers in contact with the shaft and sleeve or hub, there being oil-passages extending through the latter and casing.

3. A roller-bearing comprising a non-rotatable casing, a sleeve or hub rotatable within said casing, an axle or shaft rotatable within the sleeve or hub, non-rotatable disks in the ends of the casing, and a pair of rollers in contact with the shaft and sleeve or hub and having end bearings in said disks.

4. A roller-bearing comprising a non-rotatable casing, a sleeve or hub rotatable within said casing, an axle or shaft rotatable within the sleeve or hub, non-rotatable disks in the ends of the casing, and a pair of rollers in contact with the shaft and sleeve or hub and having end bearings in said disks and heads at the end of said casing.

5. A roller-bearing comprising a non-rotatable casing having lubricant-inlets, a sleeve or hub rotatable within said casing and having lubricant-passages, an axle or shaft rotatable in said sleeve or hub, a pair of shaft-supporting rolls, and stationary links having bearing-openings receiving the ends of said rolls.

In testimony whereof I affix my signature in presence of two witnesses.

LYMAN P. WALTER.

Witnesses:
FRED S. SMITH,
ZELLA TUTER.